Aug. 21, 1962  G. SLAYTER ET AL  3,050,427
FIBROUS GLASS PRODUCT AND METHOD OF MANUFACTURE
Filed April 29, 1957  4 Sheets-Sheet 1
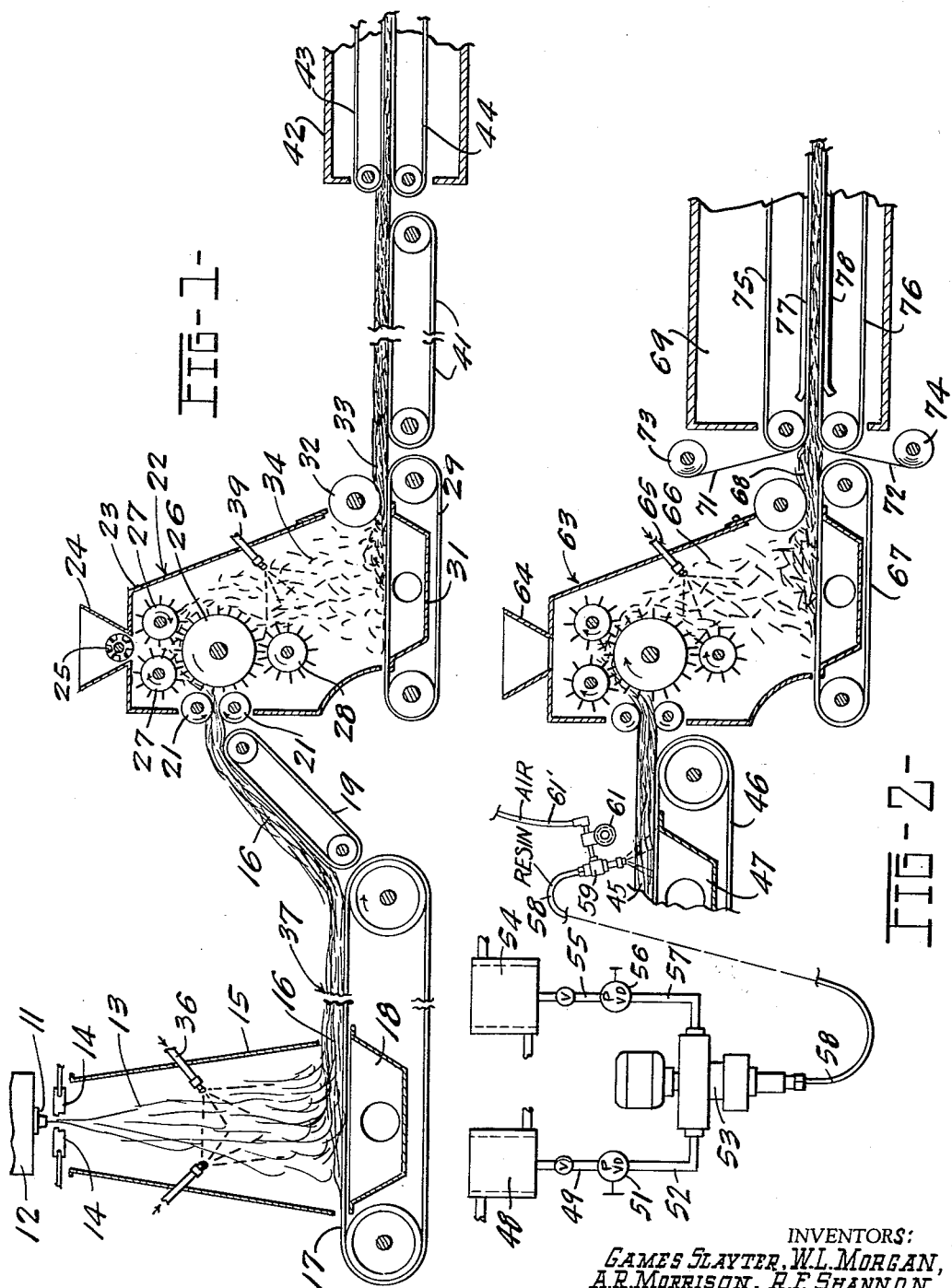
INVENTORS:
GAMES SLAYTER, W.L.MORGAN,
A.R.MORRISON, R.F.SHANNON.
BY
ATTYS.

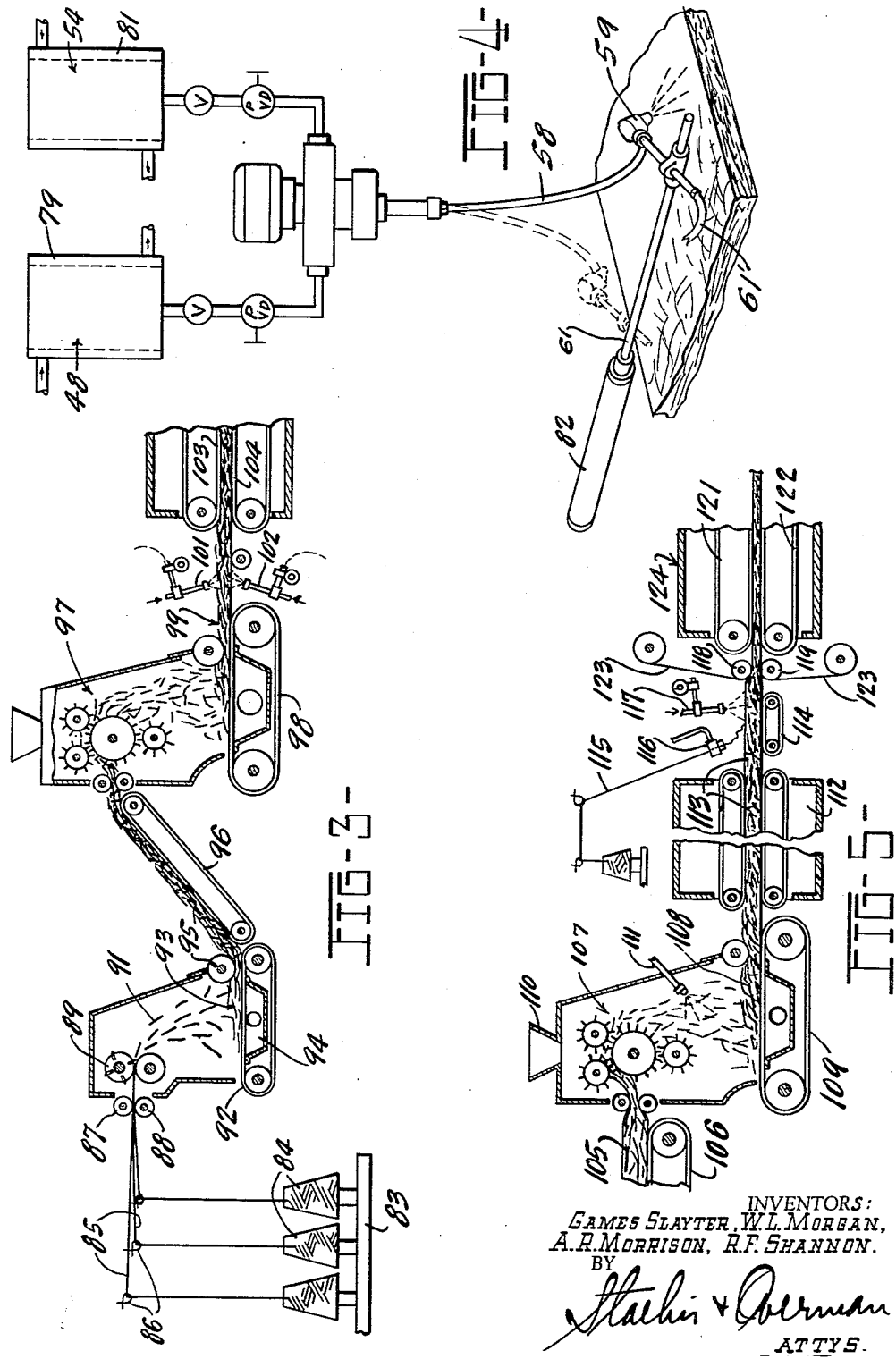

Aug. 21, 1962 G. SLAYTER ET AL 3,050,427
FIBROUS GLASS PRODUCT AND METHOD OF MANUFACTURE
Filed April 29, 1957 4 Sheets-Sheet 3
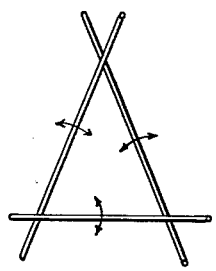
FIG-6-
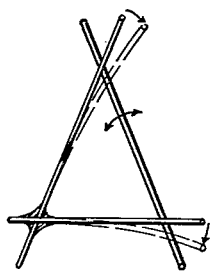
FIG-7-
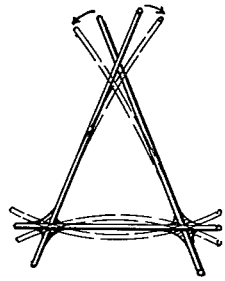
FIG-8-
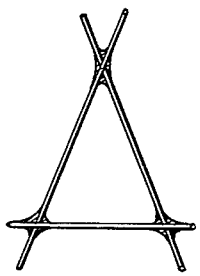
FIG-9-
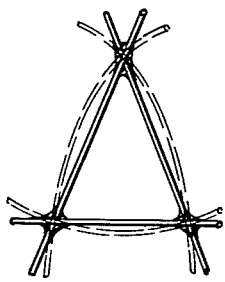
FIG-10-
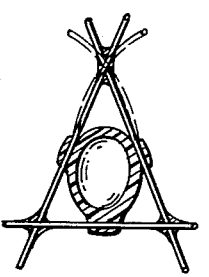
FIG-11-
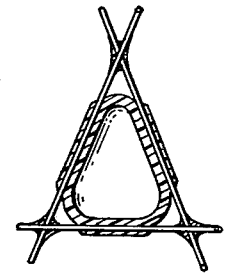
FIG-12-
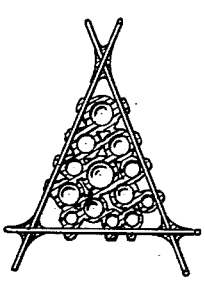
FIG-13-
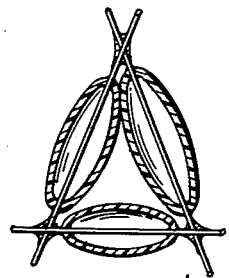
FIG-14-
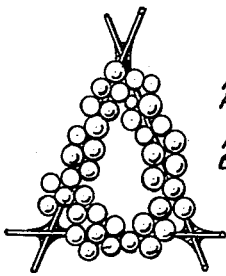
FIG-15-
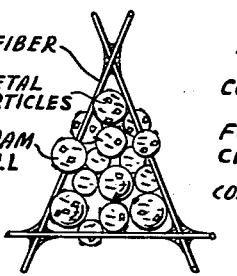
FIG-16-
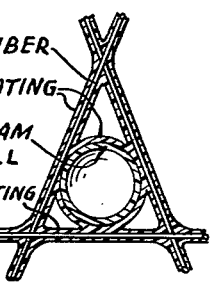
FIG-17-
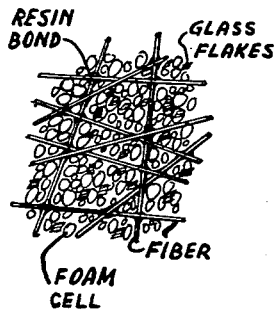
FIG-18-
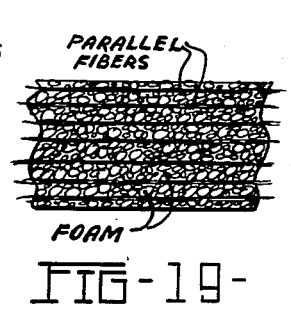
FIG-19-
INVENTORS:
GAMES SLAYTER, W.L. MORGAN,
A.R. MORRISON, R.F. SHANNON.
BY
ATTYS.

Aug. 21, 1962   G. SLAYTER ET AL   3,050,427
FIBROUS GLASS PRODUCT AND METHOD OF MANUFACTURE
Filed April 29, 1957   4 Sheets-Sheet 4
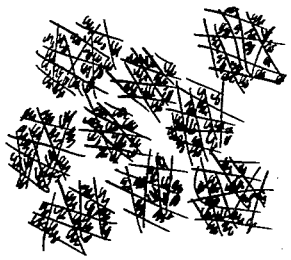
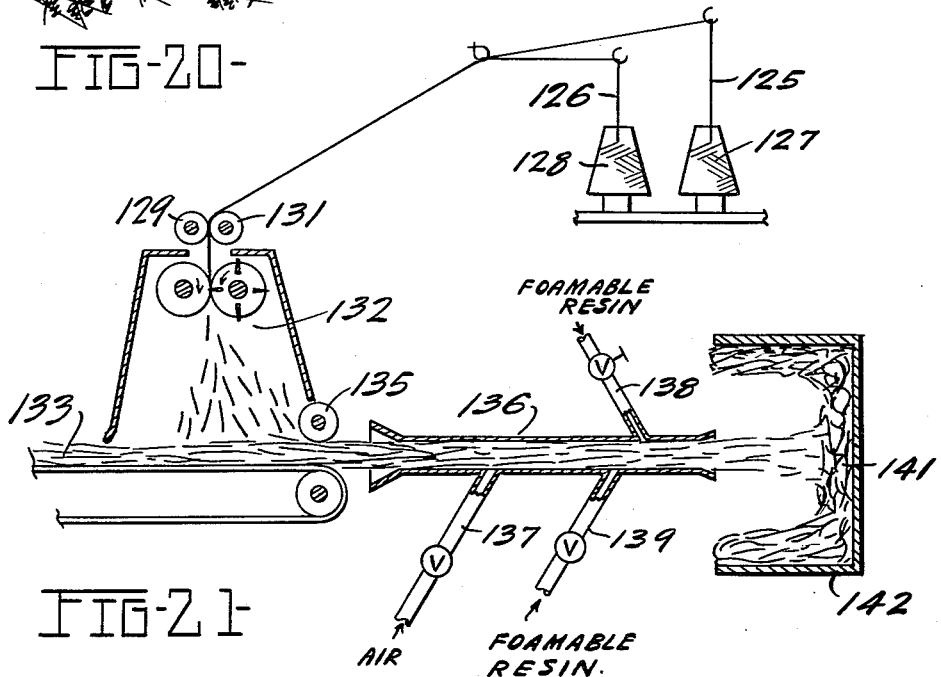
INVENTORS:
GAMES SLAYTER. W.L.MORGAN.
A.R.MORRISON. R.F. SHANNON.
BY
ATTYS.

3,050,427
FIBROUS GLASS PRODUCT AND METHOD
OF MANUFACTURE
Games Slayter, Willard L. Morgan, and Albert R. Morrison, Newark, and Richard F. Shannon, Lancaster, Ohio, assignors to Owens-Corning Fiberglas Corporation, a corporation of Delaware
Filed Apr. 29, 1957, Ser. No. 655,675
9 Claims. (Cl. 156—26)

This invention relates to a method for producing a composite foam and mineral product, and more particularly to a method for producing such a product composed of mineral fibers associated with a foamed material.

Various suggestions have been made for producing structures composed of a foamed material in a set condition, which set condition can range from elastomeric as in the case of foamed rubber through various intermediate degrees of hardness to substantially unyielding materials, as in the case of foamed, inorganic cementitious materials.

Various fillers, fibrous and granular in nature, can be admixed with numerous foamed materials prior to hardening or setting of the foamed materials in order to modify the physical properties of the finished articles. For example, the use of dyes or pigments to color the finished products, the use of inert, finely divided extenders, and the use of fibrous fillers to increase strengths have all been suggested. A serious problem has been encountered, however, when it has been attempted to increase the strengths or other physical properties by admixing a fibrous material with a foamable resin and then setting the resin or cementitious material. It has been found that most methods enable the introduction of only a comparatively small proportion of fibrous material with the result that achieving substantially improved physical properties is impossible.

When fibrous fillers of sufficient length to improve physical properties are mixed with material to be reinforced in the necessary amounts to be advantageous, it is found that balling occurs during the mixing procedure. In general, limited amounts of fibers of any given length and diameter can be so mixed without balling. However, the tendency towards balling increases when fiber diameter is decreased and when the length of the fibers is increased. Fibers having a diameter more than about 150 hundred thousandths of an inch and fibers shorter than about ½ inch are not significantly effective for reinforcing other materials. Fibers having a diameter less than 150 hundred thousandths of an inch and longer than about ½ inch cannot be mixed with the material to be reinforced in effective proportions without balling.

It has been found that the addition of a fibrous material to liquid foamable materials causes an increase in viscosity of the foamable materials with the result that it is very difficult to stir in more than about 10 percent by weight of fibers based upon the weight of the foamable material. Mixing fibrous materials into a liquid foamable material always causes some damage to the fibers. The damage may involve breaking which decreases fiber length and lowers strand integrity. Physical properties of the final product are inferior to those which should be achieved with the amount of reinforcement provided by the fiber sizes charged when the fibers have been broken during the mixing.

The present invention is based upon the discovery of an improved method and apparatus for producing a structure which includes mineral fibers associated with or bonded to a foamed, set material. This method enables the production of such a structure containing a heretofore unachievably high proportion of mineral fibers. The method is extremely effective for producing structures comprising mineral fibers and a foamed, set material in any desired proportions within an extremely broad range.

In general, the invention comprises processes and products formed by disrupting a fibrous mass having bodily integrity into small integral fibrous material masses retaining substantially the original bodily integrity within the smaller units, projecting into an advancing pack of these small integral fibrous masses a binder or material which is in either liquid or powder form to adhere, coat and associate with the advancing pack, the binder or material being such that as it is projected it is either actively foaming, is in the form of a fluid foam, or is a composition that upon a short delay of time or upon subsequent heating is capable of expanding to form a foam. The materials as introduced into the fibrous pack may be foamed, foaming or foamable materials such as for example, organic materials including one or more of the following: phenol formaldehyde, polyurethane, urea formaldehyde, polyvinyl chloride or polystyrene employing a suitable blowing or foaming agent as desired. The material may also be an inorganic cementitious substance such as for example, magnesium oxysulfate or gypsum which includes a material to cause foaming. The fibers and associated materials are then brought to a predetermined product dimension and the binder or foamed material advanced to a fully set condition by providing reaction time or by heating as may be necessary to complete the foaming and to form the foamed product which has the desired bond between the fibrous mass and the foamed material.

In general, the products of the invention are unique in the amount and length of mineral fiber incorporated into and reinforcing the rigid or flexible foamed structure. The products are also characterized by the fact that the fibers are intermeshed into a pack having bodily integrity. This results from the relatively long fibers employed and from the substantially large amount of fibers present. Low density products of foamed resin, which without the fiber reinforcement are too fragile to be useful, can be made with high degrees of strength and resistance to compression. Also dimensional stability is achieved through the use of fiber reinforcement. Low amounts of expensive resin may be used economically by the use of relatively inexpensive fibers to prepare very light and very strong products suitable for wall and roof boards, insulation uses, lightweight molded articles, and many other uses.

It is an object of the invention to provide an improved method for producing a structure which includes mineral fibers associated with or bonded to a foamed, set material or binder.

It is a further object to provide an improved structure which comprises mineral fibers associated with a foamed, set material, which structure can be produced by a new method of the invention.

It is also an object to associate a foamable, settable material with a very uniform mass of mineral fibers intermeshed to an extent such that the mass has bodily integrity, and to foam and set the material while associated with the mass and while in a controlled working zone.

It is also an object of the invention to associate a foamable, settable material with small integral masses of mineral fibers intermeshed to an extent such that the mass has bodily integrity and to foam and set the material while associated with the mass and while in an enclosed zone to produce a unitary structure.

Other objects and advantages will be apparent from the description which follows, reference being made to the accompanying drawings, in which:

FIGURE 1 is an elevational view of apparatus used in carrying out the invention, parts being in section;

FIGURE 2 is a view in elevation partly in section of a modified form of apparatus for carrying out the invention;

FIGURE 3 is an elevational view of apparatus for producing products of the invention from continuous fibers;

FIGURE 4 is a perspective view of apparatus for spraying a foamable material upon a fibrous pack;

FIGURE 5 is an elevational view of apparatus in a modified form for carrying out the invention;

FIGURE 6 is a view of a fragment of an open mass of mineral fibers useful in practicing the invention and representing one type of intermeshing of fibers which relies upon no binder but provides bodily integrity to the mass of fibers;

FIGURE 7 is a view showing a modified type of intermeshing where some binder is effectively contributing to the bodily integrity of the mass by interlocking certain of the individual fibers;

FIGURE 8 is a view showing a greater quantity of binder to increase bodily integrity;

FIGURE 9 is a view showing a still greater amount of binder effective to increase bodily integrity;

FIGURE 10 is a view showing a type of fiber movement which is possible in the FIGURE 9 structure when the mass is subjected to a load;

FIGURE 11 is a view of a fragment of a mass of intermeshed and interlocked mineral fiber intimately associated with a foamed material;

FIGURE 12 is a view showing a different configuration of a foamed material intimately associated with the fibers;

FIGURE 13 is a view showing a plurality of small cells of a foamed material intimately associated with the fibers;

FIGURE 14 is a fragmentary view showing still another spatial configuration of foamed material intimately associated with the mass of mineral fibers;

FIGURE 15 is a view showing a fragment of a mass of intermeshed mineral fibers intimately associated with a foamed material adhered to the fibers;

FIGURE 16 is a view showing a material such as metal particles and a foamed material intimately associated with a mass of mineral fibers;

FIGURE 17 is a view showing the structure which results from a further modification involving the application of a binder as a coating;

FIGURE 18 is a view showing the modification where the mass of mineral fibers intimately associated with a foamed material has been bonded with a resinous binder;

FIGURE 19 is a view of a product comprising a foamed material associated with generally parallel mineral fibers;

FIGURE 20 is a view showing nodules of fibers intimately associated with a foamed material, which nodules represent one product of the invention;

FIGURE 21 is an elevational view partly in section showing apparatus for carrying out the invention; and FIGURE 22 is a view of a product having a core of intimately associated mineral fibers and a foamed material with surfaces of a film or sheet such as resin or the like.

In FIGURE 1, a feeder 11, disposed below a source of molten glass 12, forms streams of glass which are attenuated into fibers 13 by the action of the blast emitting from steam blowers 14, 14. The fibers 13 so produced are contained within a hood 15 until they are collected in the form of a mat 16 on conveyor belt 17. Suction box 18 induces the deposition of the fibers in the form of a mat upon the conveyor. The pack of fibers or mat 16 passes upwardly on conveyor 19 into the fluted rolls 21, 21 which feed the mat into picker 22. The picker comprises a housing 23 provided with hopper 24 through which a powdered material such as a foamable resin is introduced. Hopper 24 has a rotatable metering device 25 which is variable speed and accomplishes the proper feed rate for the powder being introduced into the picker 22. The picker comprises a large diameter picker drum 26 and multiple picker rolls 27, 27 arranged about its periphery. The interaction of the picker drum and picker rolls shreds the mat or pack into nodules or clumps of fibers and into individual fibers that are then recollected. Picker roll 28 is disposed below picker drum 26 to help in the tearing apart of the mat or pack and to prevent the nodules or fibers from passing all the way around the picker drum 26 as it rotates. Picker roll 28 throws the fibers from the periphery of the picker drum toward collecting chain 29. The deposition of the fibers and nodules of fibers is promoted by the forces of gravity and by the action of suction box 31. Gate roll 32 rides upon the reconstructed mat 33 to seal the interior of the picker from the outside atmosphere. Mat 16 is torn apart by the action of the picker drum and picker rolls when they rotate as indicated by the arrows. The fibers 34 fall downwardly within the picker. Mat 16 is bonded into an integral product by the application of binder through nozzles 36 in hood 15. Depending upon the binder applied by nozzles 36, it may be advantageous to have an oven for curing the binder inserted at the break 37 in conveyor 17. For instance, if a phenolic resin is applied with nozzles 36 in hood 15, the resin can be advanced to a cured set condition within an oven which is inserted at the break line in the drawing. The picker drum and picker rolls have spikes 38, 38 protruding from their peripheries. These spikes intermesh, the spikes upon the picker rolls having a small clearance between the end of the spikes and the periphery of the picker drum. Likewise the spikes of the picker drum have but a small clearance between their ends and the periphery of the picker rolls. A suitable binder is applied with nozzle 39 if it is desirable to do so. The reconstructed mat 33 then passes over transfer conveyor 41 to heating zone 42. The reconstructed mat 33 with the foamable material applied through hopper 24 and metering device 25 is foamed and advanced to a set condition between confining belts 43, 44 within heating zone 42.

In FIGURE 2 is shown another embodiment of the invention. A fibrous pack 45 is advanced upon conveyor belt 46 and a foamable material is applied thereto and sucked through the pack by the action of suction box 47.

A mixture of a low free-formaldehyde phenol formaldehyde resin, isopropylether and polyoxyethylene sorbitan monopalmitate is prepared and stored in container 48 from which it flows through line 49, metering pump 51 and line 52 to mixing device 53. In a like manner, a solution of sulfuric acid is mixed and stored in container 54 from which it flows through line 55, metering pump 56, through line 57 to mixing device 53. The foamable material leaving mixing device 53 is forced through line 58 to a nozzle assembly 59 which is traversed across the fibrous pack upon shaft 61. Air is introduced through line 61 to act as the propelling force for spraying the foamable resin. The picker device 63 is similar to that shown in FIGURE 1 with the exception that the hopper 64 is shown closed so that it is inoperative. The hopper 64 and spray nozzle 65 are optional and may or may not be used depending upon the product to be formed. Since the foamable material is applied to the fibrous pack 45 prior to the time that it enters picker device 63, it is not essential that additional binder or foamable material be added within the picker device itself. The fibers 66 and clumps of fibers re-collect upon conveyor 67 in a reconstructed pack 68 which then enters curing zone 69 between sheets of film 71, 72 which are unrolled from supply roll 73, 74 and between confining belts 75, 76 which are backed by skid plates 77, 78.

Nozzle assembly 59 is shown in greater detail in FIGURE 4. Container 48 and container 54 are provided with cooling jackets 79 and 81, respectively. Nozzle assembly 59 is mounted upon shaft 61 which is traversed by the action of cylinder 82. The sheet of foil, paper, polyethylene, metal or other similar flexible material introduced on the upper and lower sides of the fibrous pack shown in FIGURE 2 is a surfacing material which may be left upon the product or removed as may be desired. The pack having the phenol formaldehyde material associated with it foams and sets within curing zone 69 by virtue of the reactions between the sulfuric acid and the phenol formaldehyde resin. Heat is involved in this reaction which volatilizes the ether to cause foaming. This heat also serves to cure or set the foamed resin. The fibrous pack associated with the foaming resin is disposed between the confining conveyors which hold the mass to the desired dimensions. Heat can be applied to the fibrous mass and foaming mixture in the curing zone, if desired, to accelerate the foaming and setting of the phenol formaldehyde resin. The product is emitted from the curing zone as a set, dimensionally stable board surfaced with a sheet of flexible film, paper or foil on each face.

In FIGURE 3 another form of apparatus for carrying out the invention, utilizing continuous filaments as the starting material, is shown. The apparatus comprises a creel 83 which includes a plurality of packages of strand 84, 84. The strands or bundle of filaments 85, 85 removed from the packages are passed through guide eyes 86 and between a pair of feed rolls 87, 88 into a cutter 89 which is adapted for cutting the strands to the desired length. This chopper can be set in such a manner that lengths of strand from about ¼ of an inch in length to about 2 inches can be produced. The cut strands or fibers 91 fall upon belt 92 to form a mat 93 due to the action of suction box 94. This mat passes under gate roll 95 and then up transfer conveyor 96 to be introduced into picker 97. Picker 97 breaks up the mat 93; the fibers and clumps of fibers fall downwardly onto collecting belt 98 to form a reconstructed mat 99. Although no means for applying a binder to the chopped or cut strands is shown, it is generally preferable to apply a powder or a liquid or both a powder and a liquid to the cut strands and to the mat formed therefrom. This binder is cured in an enclosed oven which may be placed between cutter 89 and picker 97. The cured mat is then introduced into picker 97 and the clumps or nodules of integral fibers are formed into a reconstructed mat upon belt 98. As the reconstructed mat is advanced, a foamable material is applied by nozzles 101 and 102 to the upper and lower sides of the mat. The mat including the foaming, foamable or foamed material is then introduced between confining belts 103, 104. While the fibrous material and the foamable material are between the confining belts, the foamable material is advanced to a cured set condition to provide a composite product of fiber and foam having the desired density.

In FIGURE 5 is shown another form of apparatus used in carrying out this invention. Fibrous pack 105 is advanced upon conveyor belt 106 into picker 107. Although a pack of fibrous material is shown as the starting material in this view, it should be understood that other forms of fibers may be introduced into the picker. For instance, cut strands from the cutter shown in FIGURE 3 need not be formed into a mat as such, but rather the cut strands can be blown directly into the picker without first forming a mat or pack of fibers. The cutting device can be coupled with fiber forming apparatus by introducing a continuous strand from a fiber attenuating device into the cutter and then into the picker. Various setups can be used; however, the concept herein is to form a pack of fibers having greatly improved uniformity over those generally produced by former methods. These very uniform packs are combined with a foam to provide finished articles of excellent quality.

When a pack of fibers 105 is introduced into picker 107 as shown in FIGURE 5 the picker forms clumps and individual fibers which rain down within the picker to form a reconstructed mat 108 upon belt 109. A powdered binder may be introduced through hopper 110 and a liquid binder may be introduced through nozzles such as that indicated at 111. A curing oven 112 is used to set the binder applied within picker 107. As bonded pack 113 is passed over conveyor 114 a strand 115 or multiple strands are introduced upon the surface of the bonded pack by one or more air blowers 116. Instead of using an air blower to introduce the strand a pulling wheel or a pair of pulling wheels which cooperate to advance a strand may be used to introduce the strand upon the surface of the mat. When pulling wheels are used to introduce the strand upon the surface of the mat, the strand can be given sufficient impetus to needle the strand into the mat so that an integral product is achieved. A foamable material is introduced through nozzle 117 and the composite then passes between squeeze rolls 118, 119 and between confining belts 121, 122 where it is allowed to set into the foamed product. In addition to the application of a strand to the surface of the mat, a suitable film 123 is introduced upon the upper and lower surfaces of the mat as the material passes into working zone 124.

The physical properties of the materials produced by the methods of the invention can be varied broadly by varying the characteristics of the mass of mineral fibers which serve as the starting material, the identity of the foamable material, and the amount and nature of the foaming agent therein. The effect of variations and extent of bonding between individual fibers upon rigidity of a mass thereof has previously been discussed. The amount of glass or other mineral fibers in the mass, the diameters of the fibers, the modulus of the fibers, the modulus of the binder, the unsupported lengths of fibers, the bond strength between binder and fiber, the effect of any coating or strands on the fibers and the orientation of the fibers in the mass all affect the resiliency, the flexibility, the rigidity, the orientation of the fibers in the mass and the load bearing ability of the mass. In general, the flexibility, the resilience and the load bearing ability or the rigidity of a finished product can be expected to be related to the properties of the mass. Other factors also contribute to the physical properties of the final products. For example, whether or not the foamable material is a binder for the glass fibers, whether or not the fibers are wet by the foamable material, whether or not the fibers or the foam cells or both are coated by a non-foamed material, and the physical properties of the foamed material itself are all factors which influence the physical properties of the final product. Several variations in structure of the final products that can be achieved according to the methods of the invention are shown in FIGURES 11 through 17. In all of these figures the mass of intermeshed mineral fibers is represented as being of the type shown in FIGURE 9, although the same variations can be accomplished where the mass of mineral fibers is of any of the types shown in FIGURES 6 to 10.

In each of FIGURES 11 through 17, the three mineral fibers are shown bonded together by globules of resin or binder; these globules of binder are not necessarily spherical in shape but may be of any configuration. In FIGURE 11 a single bubble of a foamed material is shown intimately associated with the fibers. A structure of this type is formed when the foam cells are relatively large. The generally spherical shape of the cell or bubble indicates that the ability of the foamable material to wet the fibers is rather low.

In FIGURE 12 a single bubble of a foamed material is shown intimately associated with the fibers. The relatively large cell or bubble conforms substantially to the shape formed by the fibers, indicating that the fibers are readily wetted by the foamed material so that the adhesive forces between the fibers and the bubble are rather high.

Both of the structures shown in FIGURES 11 and 12 include rather large bubbles of the foamed material. In FIGURE 13 a preferred structure is shown which includes a plurality of small bubbles of a foamed material. The bubbles are represented as being substantially spheroidal as in the FIGURE 11 structure which is probably an idealized structure, since as a practical matter, irregular polyhedral cells will probably be formed. The small size of the bubbles and their uniform distribution in the FIGURE 13 structure is advantageous because the product has higher thermal insulating properties, greater compression strengths, better resiliency and greater rigidity. The use of a foamable material having a low surface tension and a finely divided and uniformly distributed foaming agent facilitates the production of such structures.

Still another type of foam bubble is shown in FIGURE 14. Each of these bubbles is generally ovaloid in shape with several of the cells or bubbles having one of the mineral fibers extending generally therethrough. Such a foamed structure is achieved when the foaming material pushes some foaming and possibly also foamable material through the mass of mineral fibers. To form this kind of structure, the material must be one which adheres to the mineral fibers. In this case, a thin layer of the foamable material would remain on at least some of the mineral fibers, which layer would be converted to a set condition along with the rest of the material.

A plurality of small bubbles are shown in the FIGURE 15 structure, the small bubbles being clustered about the mineral fibers. In general, the conditions which tend to cause a structure of the FIGURE 14 type will cause a structure of the FIGURE 15 type if the foamable material is one which produces a plurality of small bubbles. A finished product which is predominantly of the FIGURE 15 type will probably also include some portions which are similar to the FIGURE 13 structure, and in general, portions similar to the structures shown in FIGURES 11, 12 and 14. These structures may also include some portions similar to structures of FIGURES 6 through 9. Similarly when any of the structures of FIGURES 11 through 14 predominate, corresponding variations can be expected. The properties of the final products depend upon what type of structure predominates. The methods of the invention enable the making of final products wherein any of these structures predominates.

In general, surface tension is a major factor which controls cell size. By decreasing the surface tension of the foamable material or by decreasing the particle or droplet size of the foaming agent and increasing the uniformity of distribution thereof, average cell size of the final foam can be decreased. By increasing the viscosity of the foamable material at the time of foaming, the average cell size after foaming can be decreased and the apparent density of the foam can be increased. When foaming into a confined space, cell size can be decreased and apparent density increased by decreasing the size of the confined space with respect to a given volume of resin and fiber. The nature and amount of blowing agent used and the temperatures also affect the cell size. Suitable wetting agents are polyoxyethylene-sorbitan monopalymitate, polyoxyethylene sorbitan trioleate, lauryl sodium sulfate, alkyl aryl polyether alcohols, and alkyl benzene sodium sulfonates.

Many materials can be employed to vary the wetting of and adhesion to the fibers. For example, the above listed wetting agents generally tend to increase the ability of a material to wet as well as to affect the foam cell size by lowering surface tension. The use of various coupling agents to pretreat the fibers also affects the ability of a material to wet and to adhere to the fibers. Where an epoxy, melamine, urea-formaldehyde or phenolic resin is used as the foam, a gamma amino propyl triethoxysilane pretreatment of the fibers improves the wetting of and adhesion to the fibers and the strength of the final products. Pretreating the fibers with vinyltriethoxysilane, alkyltriacetoxysilane, or methacrylato chromic chloride gives improved wetting and adhesion where the foamed resin applied is a polyester or polyurethane. Conversely, where it is desired to provide a looser structure, the pretreatment of the fibers with a dimethyl polysiloxane or with octadecyltrichlorosilane will give a poor wetting and a low adhesion product with many resin foams.

The structure shown in FIGURE 16 is similar to that of FIGURE 13 in that it includes a plurality of comparatively small bubbles of a foamable material distributed within the shape formed by the fibers. In the FIGURE 16 structure, however, a second material designated as being metal particles is also distributed in the interstices separating the bubbles and may be co-deposited with the mass of mineral fibers, may be carried into the mass by the foaming resin, or may be introduced by a post-treatment of the article after setting of the foamed material. This second material can be a plurality of flakelets of glass to provide a vapor barrier, metal particles which can be in the shape of powder or flakes and tend to make the product reflective, glass beads which act essentially as fillers, expansible polystyrene beads, or a hardened material such as synthetic resin which tends to reinforce and strengthen the product. In addition, the material can be a pigment, a dye, an inorganic filler such as calcium carbonate, or a low density inorganic filler.

The structure shown in FIGURE 17 comprises a single, relatively large bubble or cell of a foamed material contacting each of the mineral fibers. In addition, the entire product after foaming has been treated with a material which wets both the mineral fibers and the foamed material so that this material after conversion to a set condition appears as a coating on the surfaces both of the fibers and of the bubble.

A product such as that shown in FIGURE 18 is produced by introducing into the picker a material such as glass flake that codeposits with the fibers to form a composite comprising fiber, flake and foam. The product may also include a binding material such as a resinous binder that is sprayed or otherwise introduced into the mat as it is being formed. Interstices of the product are filled with foam to provide a product having the desired density and various other physical properties. The products of this invention can be laminated or otherwise combined with generally parallel fibers such as shown in FIGURE 19 to form a very strong product. The parallel fibers can be introduced at the formation step which produces the foamed product or the foam layers can be plied up in subsequent steps with parallel fibers as shown. The products of the invention can also be formed into nodules such as shown in FIGURE 20. These nodules are then introduced into an article which is to be insulated and the interstices between nodules filled with more foam which may be sprayed into place and then foamed to form an integral product.

In order to form insulation products comprising foam and fibers in the place in which they are to be used, apparatus such as that shown in FIGURE 21 is utilized. Here strands 125, 126 are removed from packages 127, 128 in a creel. The strands pass through suitable guide eyes then to feed rolls 129, 131 which introduce the multiple strands into cutter 132. The chopped strands deposit upon a strip of fibrous pack 133 being advanced upon conveyor 134. The strip of fibrous pack and chopped strand passes below gate roll 135 and into mixing blower 136. Air introduced through inlet 137 advances the strip of fibrous pack through the device. A foamable resin is introduced through inlets 138, 139 and the foamable resin and fiber mixture blown from the mixing blower 136 deposits in the form of a pack 141 in the structure 142 to be insulated. The fiber supplied to the mixing blower 136 may be chopped or shredded fibers either alone or added onto a strip of fibrous pack. Nodules such as those shown in FIGURE 20 are well adapted for use in a blowing apparatus such as that shown in FIGURE 21. These nodules are formed by associating a foamed material with torn-up shreds of fibrous pack and advancing the foam to a set condition while agitating or moving the shreds to roll them into nodules.

Representative thermosetting synthetic resinous materials that can be used for this purpose include phenolic resins, such as phenol- or substituted phenol-aldehydes, urea-aldehydes, melamine-aldehydes, polyesters, epoxy resins, silicones, furfurals, gelatin formaldehydes, and similar thermosetting partial condensation products. Representative thermoplastic synthetic resinous materials that can be so employed include polyvinyl alcohol, polyvinyl acetate, polyvinyl chloride, polyvinyl butyral, polyethylene, polystyrene, polyamides, coumarone-indenes, polyvinylidene chloride, cellulose acetate, ethyl cellulose, alkyds, methylmethacrylate, ethylmethacrylate, cellulose acetobutyrate, and other similar known materials. Various elastomeric materials can also be employed, for example, natural rubber, polychloroprene, polybutadiene, polybutene, styrene-butadiene copolymers, butadiene-acrylonitrile copolymers, polysulfide elastomers, and the like. In addition, various synthetic and naturally occurring binder materials such as starch, albumen, casein, carboxymethyl cellulose, polyvinyl-pyrrolidone, terpenes, shellac, asphalt and various natural glues are likewise suitable. Also, various mineral and vegetable oils and compositions comprising mineral and vegetable oils which have been suggested for use as sizes on such mineral fibers can be employed to interlock individual fibers and to provide for increased bodily integrity of the mass, as discussed above.

The specific identity of the foamable, foaming or foamed material in the assembly of FIGURE 1 constitutes no part of the instant invention. Broadly speaking, the foamable binder can be either organic or inorganic in nature. A phenol formaldehyde partial condensation product, or "A-stage" resin with ammonium carbonate mixed therein at the point of injection from the needles is a specific example of such a foamable binder. Ammonium carbonate is a material which will evolve a gas when heated to a temperature below that at which final curing of the partial condensation product occurs. The gas evolution causes foaming of the binder and further heating cures the resin while in the foamed condition. Examples of other materials which evolve a gas upon heating to temperatures below those at which curing of a resinous binder can be accomplished include sodium bicarbonate, dinitroso-pentamethylene-tetramine, N,N'-dimethyl N,N'-dinitrosoterephthalamide, and p,p' oxy bis (benzene sulfonyl hydrazide). A volatile solvent such as isopropyl ether, water, or the like can also be mixed with the binder and vaporized by heat to cause the desired foaming. A resinous binder can also be made foamable by dispersion therein of finely divided solid carbon dioxide or other frozen gas, or by inclusion of materials which will react to evolve a gas, for example, aluminum or magnesium and an acid or alkali, or calcium carbonate and an acid.

Other synthetic resinous organic binders than phenol formaldehyde partial condensation products can also be made foamable in the indicated ways. For example, other thermosetting binders such as other phenol aldehyde condensation products, urea-aldehyde partial condensation products, melamine aldehyde partial condensation products, resorcinol aldehyde partial condensation products, polyesters, epoxy resins, silicones and furfuryl-aldehyde partial condensation products, and the like can be so blended to produce a foamable material and employed in the embodiment of the invention shown in FIGURE 1.

In addition, inorganic binders can be made foamable in any of the indicated ways and so employed. Preferred inorganic binders are cementitious in nature. Gypsums, Portland cement, magnesium oxysulfate, magnesium oxychloride, zinc oxysulfate, zinc oxychloride, magnesium oxyphosphate, zinc oxyphosphate, alumnite cement, metal silicates such as calcium silicate and aluminum silicate, pozzolanic cements, and colloidal silicic acid are among the preferred inorganic cementitious binders.

Various thermoplastic binders, natural and synthetic, can also be mixed with foaming agents and used in such embodiment. Examples of such binders include polyvinyl acetates, polyvinyl alcohols, polyvinyl chlorides, polyvinyl butyrals, polyvinylidine chlorides, cellulose acetates, ethyl cellulose, asphalt, poly-methylmethacrylates, polyethylmethacrylates, cellulose acetobutyrates, terpenes such as those available under the trademark "Vinsol," shellac, gelatin-formaldehyde materials, casein, carboxymethyl cellulose, polyvinyl-pyrrolidene, natural rubber, polychloroprene, polybutadiene, polybutene, acrylonitrile, butadiene acrylonitrile copolymers, polysulfide elastomers, butadiene acrylonitrile copolymers, and the like.

Foamable binders which are vinyl chlorides, vinylidene chlorides, vinyl chloride-vinylidene chloride copolymers, and epoxy resins are particularly suited for use in practicing the invention.

Polyurethane foamable organic binders can be employed in practicing the method of the FIGURE 1 embodiment of the invention. A polyurethane foam can be produced from a polyester, an isocyanate, and an amine accelerator in the presence of water. Such a mixture begins foaming shortly after the various constituents are brought together so that intimate mixing must be accomplished rapidly and the admixture produced must then be promptly disposed of in the desired manner for foaming.

The foamable binder can be a resinous material in which a gas is dispersed under pressure, as is suggested in U.S. Patent 2,023,204. In such instances, foaming occurs almost immediately upon release of the pressure from the resin.

In the embodiment of this invention, which has been described in connection with FIGURE 1, a foamable binder material has been employed. In some instances it may be advantageous to use a foamable material which is not a binder because it does not adhere to the fibers 32. In such case, after foaming the material is intimately associated with the mineral fibers and fills voids therebetween, but is not bonded thereto. The mass of fibers and the foamed material then both contribute insulating properties and structural integrity to the mass. Such a structure can be produced when the fibers are coated with a release agent such as a silicone, for example, which prevents wetting of the fiber by the foaming material. D.C. 200 Fluid which is a silicone produced from a dimethyl silane is an example of a silicon release agent.

It will be appreciated that the precise chemical mechanism involved in advancing a binder to a set condition will depend upon the chemical nature of the binder. For example, in the case of a thermosetting synthetic resinous binder material, heat will be involved in the final curing to advance the material to a hard condition. Such heat may be generated by an exothermic curing reaction, may be supplied to effect curing, or both. In the case of a thermoplastic material, for example, with a thermally decomposable material dispersed therein, heat will be required to soften the resin and also to decompose the material dispersed therein to release a gas to cause foaming, but cooling will be required to convert the resulting foam to a condition which is stable at room temperature. In a case where the foamable binder is one which is impregnated under pressure with a gas, release of the pressure will cause almost instantaneous foaming, accompanied by substantial chilling of the resinous binder so that when the binder is a thermoplastic material such as polystyrene maintained under pressure at a temperature slightly above its softening temperature, the rapid cooling may almost simultaneously, upon release of the pressure, accomplish both foaming and setting of the resin. When the binder is a rubber or other elastomeric material, setting may be a vulcanizing or similar reaction and in the case of the various cementitious inorganic binders, the setting may involve relatively slow chemical reactions which are not fully understood, e.g., as is the case with Portland cement.

It will be appreciated that the embodiment of the invention shown in FIGURE 1 and described in connection therewith is not limited to the forming of flat shapes as shown. The fibrous mass and foam structure can be contained in any desired way so that an article of a particular shape is produced directly. The fibrous mass associated with a foam can be placed in a mold having any desired shape, while the foam can be advanced to a hardened or set state. The mold and the cover can also be lined with an appropriate sheet material or the finished article can be sprayed with a binder so that surface layers different from the core are provided. For example, surface layers having properties such as toughness, hardness, resiliency, or the like can be produced. Numerous lightweight articles of relatively simple shape can be produced in this manner. For example, boats, bath tubs, crash helmets, and the like can be produced. Suitable dyes or pigments can be used on the exterior to provide any desired color.

Products having a variation of physical properties throughout their thickness can be produced by this invention. The foam can be injected into one side of the fibrous mass leaving the other side of the mass unassociated with the foam; or the foam can be positioned in the center of the mass with none at the faces; or the fibers at both faces can be associated with the foam with a center portion of the fibrous mass being relatively free of foam. The latter product would be of particular value as an insulation board having structural and impact strength. It is also possible to inject more than one type of foam into the mass so that one surface contains an elastomeric foam and the other a hard, rigid foam.

Filler materials can be added to the product. These fillers include such materials as non-expanded polystyrene beads, resinous microballoons, glass beads, calcium carbonate, silica, pigments, dyes, antiseptic materials, fungicides, clays, aluminum powder or flakes, metal powder or flakes.

Materials which can be added to the foaming materials in this invention include those which will function as an anti-oxidant such as triphenylphosphite and materials such as lead salts of 2,6 ditertiarybutylparacresol which is used to protect vinyl compounds against sunlight damage.

Other additives include fire retardants and flame proofing materials including ammonium phosphate, ammonium sulfate, urea, boric acid, ammonium carbonate, tricresyl phosphate, and chlorinated naphthalene.

The following examples are presented solely for the purpose of further illustrating and disclosing the invention and are in no way to be construed as limitations thereon.

*Example 1*

A structure which includes mineral fibers bonded to a foamed, hardened, synthetic resinous binder is produced as follows:

A charge of 16 parts by weight of a soluble ash "A" stage phenolic resin, 0.48 part of bentonite as a thickener, 1.6 parts of ammonium carbonate as a foaming agent, and 5 parts of water is prepared, first adding the bentonite to the water, then the ammonium carbonate, and finally the resin. The mix is then agitated in any suitable way to accomplish a uniform dispersion and the resulting resin dispersion is introduced into a mass of mineral fibers. The mass is then heated dielectrically sufficiently to cause foaming of the resin, which results in an expansion thereof and an intimate association with the mineral fibers and also curing thereof while in a foamed condition with the result that the mineral fibers are bonded to the foamed and hardened phenol formaldehyde resin.

As much as about 0.16 part of polyoxethylene sorbitan monopalmitate can be added to this foamable binder to produce smaller foam cells.

The foamable and hardenable synthetic resinous material described above can also be used in practicing any of the methods described herein.

*Example 2*

A structure which includes mineral fibers bonded to a foamed, hardened, inorganic cementitious binder is produced according to the following procedure:

0.01 part of polyoxyethylene sorbitan monooleate as a wetting agent and 1.5 parts of magnesium sulfate heptahydrate ($MgSO_4.7H_2O$) are dissolved in 1.5 parts of water. 0.25 part of ammonium carbonate and 0.05 part of a fatty alcohol sulfate commercially available under the trade designation "Duponol ME dry," are then added to the solution, followed by one part of calcined brucite (MgO). The entire mix is then subjected to rapid agitation for a period of about one to five minutes. The resulting inorganic cementitious binder dispersion is then introduced into a mass of intermeshed mineral fibers. The mass is heated to a temperature of about 180° F. to about 250° F. for from about one-half to five minutes. The heating causes foaming of the binder dispersion and also hardening thereof, while in a foamed condition with the result that the mineral fibers are bonded to the foamed and hardened inorganic cementitious binder which is a magnesium oxysulfate cement.

The foamable and hardenable cementitious inorganic binder dispersion described above can also be used in the other methods which have been described.

*Example 3*

Another foamable, hardenable, inorganic cementitious binder which is utilized in practicing the method of the invention as described in Example 2 can be produced according to the following procedure:

A solution is prepared from 0.48 part of water, 0.01 part of polyoxyethylene sorbitan monooleate, 0.05 part of a fatty alcohol sulfate commercially available under the trade designation "Duponol ME dry" and 0.15 part of ammonium carbonate. One part of calcium sulfate hemihydrate ($CaSO_4.\frac{1}{2}H_2O$) is then thoroughly mixed with the resulting solution to produce a foamable, hardenable, gypsum-type cementitious inorganic binder. This binder is used as described in Example 2.

*Example 4*

A foamable phenol formaldehyde binder is produced by mixing 20 parts by weight of a low, free formaldehyde phenol formaldehyde partial condensation product commercially available under the trade designation "Bakelite BRL2759" with 80 parts by weight of a low, free-formaldehyde phenol formaldehyde partial condensation product commercially available under the trade designation "Bakelite BRL2760." The mixing is carried out with rapid agitation to beat air into the mix. A second mix is prepared from 6.6 parts by weight of isopropyl ether as a foaming agent and 1.0 part of polyoxyethylene sorbitan monopalmitate and the second mix added to the resin mixture; agitation is continued. 6.5 parts by weight of concentrated sulfuric acid and 0.91 part by weight of concentrated phosphoric acid are poured over 6.5 parts by weight of ice; when the ice melts, the acid solution is added to the resin mix to produce a foamable resin. The foamable mixture is introduced into a mass of intermeshed glass fibers having an apparent density of 0.5 pound per cubic foot. The resin is allowed to foam and cure for about 5 to 10 minutes. The final product is a foamed phenolic binder bonded to the glass fibers, the product having an apparent density of 2 pounds per cubic foot. It is suitable for structural use; it can be sawed, and is capable of receiving nails. The product can be subdivided, for example, to about the size of popped corn or smaller and blown into place as a dimensionally stable insulating material.

*Example 5*

A foamable resin suitable for use as described above is produced by mixing 100 parts by weight of a polyester resinous composition commercially available under the trade designation "Plaskon FFR-5," 10 parts by weight of water, 1 part by weight of N-methyl morpholine, and 1 part by weight of an emulsifier such as one commercially available under the trade designation "Witco 77-86" and believed to be a nonionic, non-sulfonated ester of a fatty acid, and then adding 210 parts by weight of toluene diisocyanate. A hard, high density fire resistant product (about 12.7 pounds per cubic foot), which is capable of receiving nails and can be used as a wood substitute, is produced from this foamable binder.

Various products made in accordance with the invention comprising a mass of intermeshed mineral fibers intimately associated with a foamed material can be porous in nature. It is sometimes desirable to reduce or eliminate the porosity. This can be accomplished after the porous product has been made, for example, by impregnating the porous product with a suitable binder which can be organic or inorganic in nature, and can be any of the binders or treatments previously discussed. A specific example of a suitable impregnating binder can be produced from 27 parts of colloidal silicic acid and 73 parts of water. Any product of the invention having open pores can be impregnated with this binder, for example, by soaking the product therein. If some porosity is desired in the final product, that product after saturation can be subjected to a partial vacuum in order to remove excess binder. The silicic acid binder tends not only to improve the physical properties of a porous product, but also to impart fireproof characteristics thereto.

Products manufactured in accordance with the invention can be made having various densities. By way of example, masses of glass fibers having densities of from 2 to 10 pounds per cubic foot have been incorporated into products made with foamed cementitious magnesium oxysulfate and gypsum cements as binders. It is comparatively easy to achieve final product densities as low as 1 to 10 pounds per cubic foot, for example, by intimately associating a foamed binder having a density of about ½ to 7 pounds per cubic foot with a mass of intermeshed mineral fibers having a density of about ½ to 3 pounds per cubic foot. Impregnating such a product with an appropriate binder increases the apparent density of the product somewhat, but it is advantageous where specific properties are required.

If desired, thickeners can and may advantageously be mixed with certain foamable materials used in practicing the invention. Thickeners are principally advantageous with foamable phenolic materials. Examples of useful thickeners include sodium alginate, ammonium alginate, bentonite, gelatin, carboxy methyl cellulose, methyl cellulose, and others.

Various changes and modifications can be made within the spirit and scope of the appended claims.

We claim:
1. Method of producing a structure comprising mineral fibers and a foamed binder comprising advancing an integral web of intermeshed fibers, mechanically disrupting said web to reduce the intermeshing of said fibers and associating a foamable binder with said fibers, recollecting said fibers in the form of an integral web, and advancing said binder to a set, foamed condition whereby the foamed binder is bonded to the mineral fibers.

2. Method of producing a structure comprising mineral fibers bonded with a foamed material comprising advancing a plurality of fibers toward a collection zone, collecting an integral web of mineral fibers, reducing the web to clumps of fibers and simultaneously associating a foamable binder with the fibers, collecting the fibers and foamable binder in the form of a web of intermeshed fibers utilizing suction, and advancing the binder to a set, foamed condition to provide a uniform, integral product.

3. A method for producing a particulate, dimensionally stable, reinforced insulating aggregate which includes mineral fiber bonded by a foamed, set binder, which method comprises advancing an integral web of intermeshed fibers, introducing a foamable binder into the web and reducing the web into particulate aggregates comprising mineral fiber and binder, and advancing the binder material to a set, foamed condition to bond the mineral fibers.

4. A method for producing an insulating element comprising particulate, dimensionally stable, reinforced insulating aggregate and a foamed, set binder, which method comprises advancing an integral web of intermeshed fibers, introducing a foamable binder into the pack and reducing the web into particulate aggregate including mineral fiber and binder, advancing the binder material to a set, foamed condition to bond the mineral fibers together, associating the aggregate with additional binder and advancing the binder to a set, foamed condition to provide an integral product.

5. A method for producing an insulating element comprising mineral fibers bonded by a foamed, set binder comprising advancing a mat of mineral fibers, associating with the mineral fibers as they are advanced a foamable binder, disrupting the mat of mineral fibers, collecting the mineral fibers and binder upon a surface utilizing suction to form an integral pack of intermeshed fibers, and advancing the binder to a set, foamed condition to provide an integral insulating layer on said surface.

6. Method of producing a structure comprising mineral fibers bonded with a foamed material comprising advancing mineral fibers toward a collection zone, directing the fibers upon an advancing open-mesh belt and forming an integral, intermeshed web by utilizing suction to draw the fibers down upon the belt, continuing the advancement of the fibers in web form, forceably disrupting the web of mineral fibers to form individual fibers and clumps of intermeshed fibers, collecting the fibers and clumps of fibers in a uniform web of fibers in a second collection zone along with a foamable binder directed into said second collection zone, and advancing the binder to a set, foamed condition to form a unitary structure.

7. Method of producing a fibrous product comprising advancing a web of intermeshed mineral fibers into a working zone, forceably disrupting the web of intermeshed mineral fibers and simultaneously associating a foamable binder with said fibers in the working zone, collecting the fibers and binder associated therewith in an integral web of fibers, and advancing the binder to a set, foamed condition to form a unitary structure.

8. A bonded mineral fiber product consisting of a plurality of clumps of intermeshed mineral fibers bonded with a set, foamed resin, said clumps being bonded one to another by a set, foamed resinous material in a uniform structure.

9. An article of manufacture comprising mineral fibers arranged in a haphazard manner within an integral web, a porous foamed resin material binding the mineral fibers one to another within the integral web, and a colloidal silicic acid sol substantially filling the porous foamed resin and web of mineral fibers to impart fireproof characteristics thereto.

References Cited in the file of this patent

UNITED STATES PATENTS

| | | |
|---|---|---|
| 2,194,036 | Talalay | Mar. 19, 1940 |
| 2,242,372 | Schneider | May 20, 1941 |
| 2,298,986 | Taylor et al. | Oct. 13, 1942 |
| 2,380,775 | Meyer | July 31, 1945 |
| 2,576,073 | Kropa et al. | Nov. 20, 1951 |
| 2,619,151 | Sheidley | Nov. 25, 1952 |
| 2,629,698 | Sterling | Feb. 24, 1953 |
| 2,664,406 | Armstrong | Dec. 29, 1953 |
| 2,719,336 | Stotler | Oct. 4, 1955 |
| 2,719,795 | Nottebohn | Oct. 4, 1955 |
| 2,779,701 | Robitschek et al. | Jan. 29, 1957 |
| 2,802,766 | Leverenz | Aug. 13, 1957 |
| 2,850,421 | Thompson | Sept. 2, 1958 |